(12) United States Patent
Huang

(10) Patent No.: US 10,883,307 B2
(45) Date of Patent: *Jan. 5, 2021

(54) WINDING ASSEMBLY AND RETRACTABLE CURTAIN

(71) Applicant: Suzhou Hongren Window Decorations Co., Ltd., Jiangsu (CN)

(72) Inventor: Jiehren Huang, Taicang (CN)

(73) Assignee: Suzhou Hongren Window Decorations Co., Ltd., Jiangsu (CN)

( * ) Notice: Subject to any disclaimer, the term of this patent is extended or adjusted under 35 U.S.C. 154(b) by 108 days.

This patent is subject to a terminal disclaimer.

(21) Appl. No.: 15/751,827

(22) PCT Filed: Sep. 13, 2016

(86) PCT No.: PCT/CN2016/098778
§ 371 (c)(1),
(2) Date: Feb. 9, 2018

(87) PCT Pub. No.: WO2018/018719
PCT Pub. Date: Feb. 1, 2018

(65) Prior Publication Data
US 2018/0230739 A1    Aug. 16, 2018

(30) Foreign Application Priority Data

Jul. 25, 2016 (CN) .......................... 2016 1 0585376

(51) Int. Cl.
*E06B 9/322* (2006.01)
*E06B 9/262* (2006.01)
(Continued)

(52) U.S. Cl.
CPC .............. *E06B 9/262* (2013.01); *E06B 9/322* (2013.01); *E06B 9/38* (2013.01); *F16H 19/06* (2013.01);
(Continued)

(58) Field of Classification Search
CPC ..... E06B 2009/3222; E06B 2009/3225; E06B 9/322; E06B 9/262; E06B 9/368; E06B 9/60; E06B 9/324
See application file for complete search history.

(56) References Cited

U.S. PATENT DOCUMENTS 5,133,399 A * 7/1992 Hiller ........................ E06B 9/30
160/170
5,267,598 A * 12/1993 Marocco ................. E06B 9/307
160/176.1 R
(Continued)

FOREIGN PATENT DOCUMENTS

CN        1828002        9/2006
CN        2865497        2/2007
(Continued)

OTHER PUBLICATIONS

International Search Report for Application No. PCT/CN2016/098778, dated Apr. 26, 2017 in 8 pages.
(Continued)

*Primary Examiner* — Johnnie A. Shablack
(74) *Attorney, Agent, or Firm* — Knobbe, Martens, Olson & Bear, LLP

(57) ABSTRACT

A winding assembly and a retractable curtain, which may adjust the tensile force of a cord. The winding assembly of the retractable curtain comprises a fixing seat and a winding shaft rotatably disposed on the fixing seat, wherein a threading hole and guiding holes are opened in the fixing seat for the cord to pass through successively; there is a plurality of guiding holes opened in different positions of the fixing seat, and the threading hole is located between the outer wall of the winding shaft and the plurality of guiding holes. The outer wall of the winding shaft tilts outward gradually along the axis thereof, and the threading hole is opened on a part (Continued)

of the fixing seat corresponding to one end of the winding shaft with a larger outer diameter.

9 Claims, 9 Drawing Sheets

(51) Int. Cl.
    *E06B 9/38*           (2006.01)
    *F16H 19/06*         (2006.01)
    *F16H 1/22*          (2006.01)
    *F16H 1/20*          (2006.01)

(52) U.S. Cl.
    CPC ............... *E06B 2009/2622* (2013.01); *E06B 2009/3225* (2013.01); *F16H 1/203* (2013.01); *F16H 1/222* (2013.01)

(56) References Cited

U.S. PATENT DOCUMENTS

| | | | |
|---|---|---|---|
| 5,328,113 A | 7/1994 | Somfy | |
| 5,799,715 A * | 9/1998 | Biro | E06B 9/322 160/170 |
| 6,536,503 B1 * | 3/2003 | Anderson | E06B 9/262 160/170 |
| 7,025,107 B2 | 4/2006 | Ciuca | |
| 7,389,956 B2 * | 6/2008 | Hung | E06B 9/322 160/170 |
| 7,562,688 B2 * | 7/2009 | Wetsema | E06B 9/322 160/84.02 |
| 7,866,367 B2 * | 1/2011 | Liang | E06B 9/307 160/170 |
| 8,002,012 B2 * | 8/2011 | Cheng | E06B 9/303 160/170 |
| 8,459,328 B2 * | 6/2013 | Anderson | E06B 9/262 160/171 |
| 8,807,194 B2 * | 8/2014 | Shun | E06B 9/303 160/170 |
| 8,820,385 B2 * | 9/2014 | Wu | E06B 9/322 160/170 |
| 8,887,788 B2 | 11/2014 | Toti | |
| 8,950,461 B2 | 2/2015 | Adams et al. | |
| 9,157,273 B2 * | 10/2015 | Dekker | E06B 9/322 |
| 9,366,076 B2 * | 6/2016 | Hung | E06B 9/322 |
| 9,366,077 B2 | 6/2016 | Chen | |
| 9,482,049 B2 | 11/2016 | Chen | |
| 9,752,380 B2 * | 9/2017 | Anderson | E06B 9/262 |
| 9,976,345 B2 * | 5/2018 | Chen | E06B 9/322 |
| 10,494,862 B2 | 12/2019 | Zhang | |
| 10,494,864 B2 | 12/2019 | Adams | |
| 2004/0144500 A1 | 7/2004 | Nien | |
| 2006/0042763 A1 * | 3/2006 | Le Ru | E06B 9/308 160/171 |
| 2006/0144527 A1 | 7/2006 | Toti | |
| 2006/0162870 A1 * | 7/2006 | Nien | E06B 9/262 160/84.01 |
| 2007/0029051 A1 | 2/2007 | Nien et al. | |
| 2007/0261798 A1 | 11/2007 | Hung et al. | |
| 2008/0083512 A1 * | 4/2008 | Hsu | E06B 9/322 160/170 |
| 2008/0087386 A1 * | 4/2008 | Nien | E06B 9/322 160/170 |
| 2008/0099157 A1 * | 5/2008 | Nien | E06B 9/322 160/84.05 |
| 2008/0210387 A1 * | 9/2008 | Yang | E06B 9/322 160/168.1 V |
| 2009/0255637 A1 * | 10/2009 | Yu | E06B 9/322 160/331 |
| 2009/0256021 A1 * | 10/2009 | Dorrough | E06B 9/303 242/397 |
| 2009/0321022 A1 * | 12/2009 | Yu | E06B 9/322 160/84.05 |
| 2010/0147470 A1 * | 6/2010 | Wong | E06B 9/322 160/370 |
| 2015/0176329 A1 * | 6/2015 | Chen | E06B 9/322 160/176.1 R |
| 2015/0354271 A1 * | 12/2015 | Hsu | E06B 9/322 160/173 R |
| 2016/0230453 A1 | 8/2016 | Chen | |
| 2016/0245017 A1 * | 8/2016 | Chen | E06B 9/322 |
| 2016/0298385 A1 * | 10/2016 | Chen | E06B 9/322 |
| 2017/0081914 A1 * | 3/2017 | Wu | E06B 9/266 |
| 2018/0230739 A1 * | 8/2018 | Huang | E06B 9/322 |
| 2018/0230744 A1 * | 8/2018 | Huang | E06B 9/262 |
| 2018/0230745 A1 * | 8/2018 | Huang | E06B 9/324 |
| 2019/0071925 A1 * | 3/2019 | Zhang | E06B 9/307 |
| 2019/0085622 A1 * | 3/2019 | Lin | E06B 9/322 |

FOREIGN PATENT DOCUMENTS

| | | | | |
|---|---|---|---|---|
| CN | 200948043 | | 9/2007 | |
| CN | 200996260 | | 12/2007 | |
| CN | 101173593 | | 5/2008 | |
| CN | 201076336 | | 6/2008 | |
| CN | 201771402 | | 3/2011 | |
| CN | 202031462 | | 11/2011 | |
| CN | 202706868 | | 1/2013 | |
| CN | 203978234 | | 12/2014 | |
| CN | 104847244 | | 8/2015 | |
| CN | 204743671 | | 11/2015 | |
| CN | 205000874 | | 1/2016 | |
| CN | 105525853 | | 4/2016 | |
| CN | 205153964 | | 4/2016 | |
| CN | 205162690 | | 4/2016 | |
| CN | 106050108 | | 10/2016 | |
| CN | 106050110 | | 10/2016 | |
| CN | 106089002 | | 11/2016 | |
| CN | 205805377 | | 12/2016 | |
| CN | 205876133 | | 1/2017 | |
| CN | 205876134 | | 1/2017 | |
| CN | 205876135 | | 1/2017 | |
| EP | 1748144 | | 1/2007 | |
| GB | 2437962 A | * | 11/2007 | ............ E06B 9/322 |
| JP | H0451284 | | 4/1992 | |
| JP | 2006070448 | | 3/2006 | |
| JP | 2015202130 | | 11/2015 | |
| TW | M255316 | | 1/2005 | |
| WO | WO 2014169172 | | 10/2014 | |

OTHER PUBLICATIONS

International Search Report for Application No. PCT/CN2016/098755, dated Apr. 27, 2017 in 8 pages.

* cited by examiner

WINDING ASSEMBLY AND RETRACTABLE CURTAIN

TECHNICAL FIELD OF THE INVENTION

The present disclosure relates to a winding assembly and a retractable curtain having the winding assembly.

BACKGROUND OF THE INVENTION

The retracting of retractable curtains such as Roman curtains is generally achieved via cords, and the cords are wound or unwound by a retractor. In the prior art, the retractor comprises synchronizing wheels and a winding shaft for winding the cords, the winding shaft and one of the synchronizing wheels are coaxially provided, a coil spring is wound on the synchronizing wheels to provide reset force, the cords are stacked and wound on the winding shaft, pass through the curtain body from the lower end to the upper end, and are stacked and wound on the winding shaft via several guiding wheels after passing through the upper end of the curtain body. The tensile force of the cord should be correspondingly adjusted with the change in the weight of the curtain body, to ensure the balance of the curtain body.

SUMMARY OF THE INVENTION

It is an object of the present disclosure to provide a winding assembly and a retractable curtain, which can adjust the tensile force of the cord according to the weight of the curtain body.

According to an aspect of the present disclosure, a winding assembly of a retractable curtain comprising a fixing seat and a winding shaft rotatably disposed on the fixing seat, a threading hole and guiding holes are opened in the fixing seat for the cord to pass through successively is provided, wherein there is a plurality of guiding holes opened in different positions of the fixing seat.

Preferably, the threading hole is located between the outer wall of the winding shaft and the plurality of guiding holes.

Preferably, the threading hole is opened on a part of the fixing seat corresponding to one end of the winding shaft.

More preferably, the outer wall of the winding shaft tilts outward gradually along the axis thereof, and the threading hole is opened on a part of the fixing seat corresponding to one end of the winding shaft with a larger outer diameter.

According to another aspect of the present disclosure, a retractable curtain comprising a curtain body, a cord for retracting the curtain body, and a retractor for retracting the curtain cord is provided, wherein the retractor comprises said winding assembly.

Preferably, the outer wall of the winding shaft tilts outward gradually along the axis thereof, the threading hole is opened on a part of the fixing seat corresponding to one end of the winding shaft with a larger outer diameter, and the cord is connected with the other one end of the winding shaft with a smaller outer diameter.

Preferably, the retractor further comprises a synchronizing wheel group and transmission assemblies located at two sides of the synchronizing wheel group for changing the transmission direction, and the transmission assembly at each side is connected with one winding assembly;

the synchronizing wheel group comprises at least one coil spring and at least two synchronizing wheels, and two ends of each coil spring are fixedly connected to two synchronizing wheels respectively so as to be wound on the two synchronizing wheels in opposite winding directions;

each transmission assembly comprises a first bevel gear and a second bevel gear which are engaged with each other, and the first bevel gears of the two transmission assemblies are connected with at least one synchronizing wheel;

each winding assembly comprises a fixing seat, and a winding shaft and a transmission shaft which are rotatably provided on the fixing seat, the transmission shaft is connected with a corresponding second bevel gear, the transmission shaft passes though and is coaxial with the winding shaft, the outer wall of the winding shaft tilts outward gradually along the axis of the transmission shaft, and a threading hole for the cord to pass through is opened on a part of the fixing seat corresponding to one end of the winding shaft with a larger outer diameter;

the extending directions of the rotating axis of the synchronizing wheel and the axis of the transmission shaft are different.

Preferably, the retractor further comprises a synchronizing wheel group and transmission assemblies located at two sides of the synchronizing wheel group for changing the transmission direction, the transmission assembly at one side of the synchronizing wheel group is connected with at least two winding assemblies, and the transmission assembly at another side of the synchronizing wheel group is connected with one or more winding assemblies;

the synchronizing wheel group comprises at least one coil spring and at least two synchronizing wheels, and two ends of each coil spring are fixedly connected to two synchronizing wheels respectively so as to be wound on the two synchronizing wheels in opposite winding directions;

each transmission assembly comprises a first bevel gear and a second bevel gear which are engaged with each other, and the first bevel gears of the two transmission assemblies are connected with at least one synchronizing wheel;

each winding assembly comprises a fixing seat, and a winding shaft and a transmission shaft which are rotatably provided on the fixing seat, the transmission shaft is connected with a corresponding second bevel gear, the transmission shaft passes though and is coaxial with the winding shaft, the outer wall of the winding shaft tilts outward gradually along the axis of the transmission shaft, and a threading hole for the cord to pass through is opened on a part of the fixing seat corresponding to one end of the winding shaft with a larger outer diameter; the transmission shafts at the same side are coaxial;

the extending directions of the rotating axis of the synchronizing wheel and the axis of the transmission shaft are different.

Preferably, the retractor further comprises a plurality of synchronizing wheel groups, two sides of each synchronizing wheel group are respectively provided with a transmission assembly for changing the transmission direction, and the transmission assemblies at two sides of each synchronizing wheel group are respectively connected with at least one said winding assembly;

the synchronizing wheel group comprises at least one coil spring and at least two synchronizing wheels, and two ends of each coil spring are fixedly connected to two synchronizing wheels respectively so as to be wound on the two synchronizing wheels in opposite winding directions;

each transmission assembly comprises a first bevel gear and a second bevel gear which are engaged with each other, and the first bevel gears of the two transmission assemblies are connected with at least one synchronizing wheel;

each winding assembly comprises a fixing seat, and a winding shaft and a transmission shaft which are rotatably provided on the fixing seat, the transmission shaft passes though and is coaxial with the winding shaft, the outer wall of the winding shaft tilts outward gradually along the axis of the transmission shaft, and a threading hole for the cord to pass through is opened on a part of the fixing seat corresponding to one end of the winding shaft with a larger outer diameter;

the extending directions of the rotating axis of the synchronizing wheel and the axis of the transmission shaft are different.

More preferably, the rotating axis of the synchronizing wheel and the axis of the transmission shaft are perpendicular to each other.

More preferably, the retractor further comprises a support for connecting to the curtain body and a mounting base for mounting the synchronizing wheels and the transmission assemblies, the mounting base and the fixing seat are fixedly provided on the support, the support is opened with a position-limit slot, the mounting base and the fixing seat have position-limit protrusions thereon respectively cooperating with the position-limit slot, and each position-limit protrusion is stuck within the position-limit slot so as to arrange both the mounting base and the fixing seat along the center line of the position-limit slot.

The present disclosure has the following advantages over the prior art: the guiding holes are opened in different positions of the fixing seat, the cord is connected to the winding shaft after passing through one guiding hole and the threading hole successively, and the tensile force of the cord is different when the cord passes through the guiding hole at different position, and thus the cord may pass through corresponding guiding hole to adjust the tensile force of the cord according to the change in the weight of the curtain body.

Figure 1:
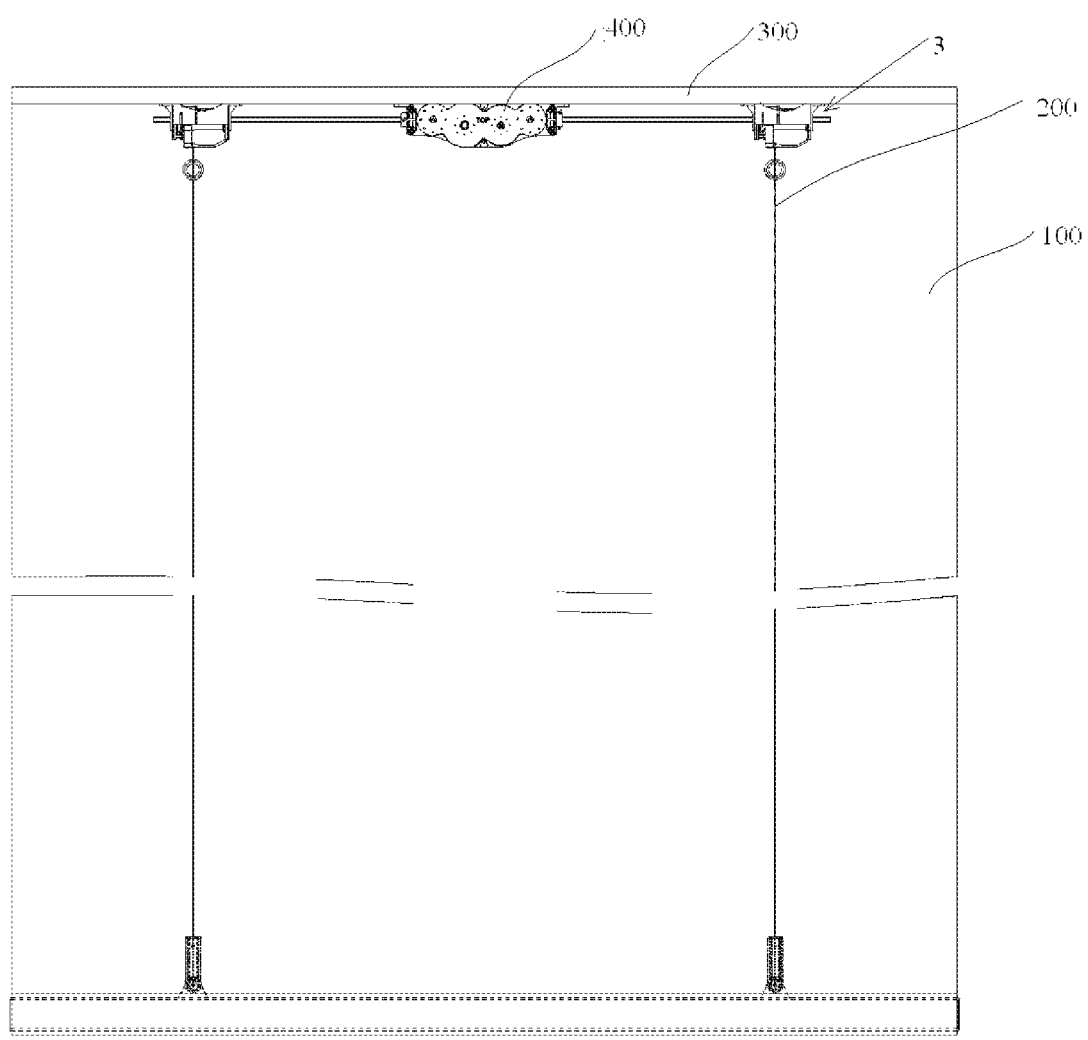
FIG. 1 is a schematic front view of a curtain after being opened of Embodiment 1 of the present invention.

wherein,

100—curtain body; 200—cord; 300—support; 301—position-limit slot; 400—mounting base; 401—position-limit protrusion;

1—synchronizing wheel group; 11—synchronizing wheel; 12—coil spring; 13—gear teeth;

2—transmission assembly; 21—cylindrical gear; 22—first bevel gear; 23—second bevel gear;

3—winding assembly; 31—fixing seat; 310—threading hole; 311—guiding hole; 312—position-limit protrusion; 32—winding shaft; 33—transmission shaft.

DETAILED DESCRIPTION OF EXEMPLARY EMBODIMENTS

In the following, the preferable embodiments of the present invention are explained in detail combining with the accompanying drawings so that the advantages and features of the present invention can be easily understood by the skilled persons in the art.

Embodiment 1

FIGS. 1-8 show a retractable curtain of the present invention, and in particular a retractable Roman curtain. Referring to FIGS. 1-8, the retractable curtain comprises a curtain body 100, cords 200 for retracting the curtain body 100, and a retractor for retracting the curtain cords 200. The cords 200 pass through the curtain body 100, and the lower ends of the cords 200 are fixedly connected with the lower end of the curtain body 100, the upper ends thereof are fixedly connected with the retractor. The upper end of the curtain body 100 is connected with a support 300 extending horizontally, and the retractor comprises a support 300, a mounting base 400 mounted on the support 300, synchronizing wheel groups 1, transmission assemblies 2 and winding assemblies 3, the left and right sides of each synchronizing wheel group 1 are respectively connected with one transmission assembly 2 for changing the transmission direction, and each winding assembly 3 is connected with at least one synchronizing wheel group 1 via one transmission assembly 2, respectively. The retractor has the following three kinds of configurations:

A) there is one synchronizing wheel group 1, the transmission assembly 2 at the left side of the synchronizing wheel group 1 is connected with one winding assembly 3, and the transmission assembly 2 at the right side of the synchronizing wheel group 1 is connected with another winding assembly 3; the present embodiment employs Configuration A, referring to FIGS. 1-6;

B) there is one synchronizing wheel group 1, the transmission assembly 2 at the left side and/or at the right side of the synchronizing wheel group 1 is connected with at least two winding assemblies 3;

C) there are several synchronizing wheel groups 1, and also several winding assemblies 3, the transmission assemblies 2 at the left and right sides of each synchronizing wheel group 1 are respectively connected with at least one winding assembly 3, wherein at least one winding assembly 3 is located between two adjacent synchronizing wheel groups 1.

Figure 7:
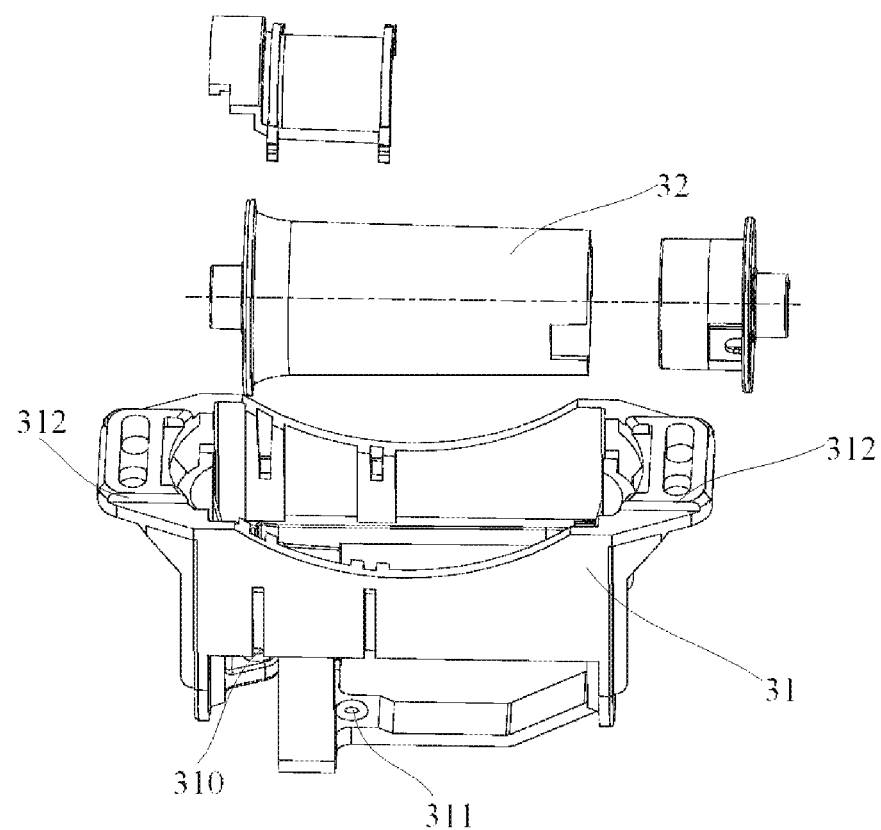
FIG. 7 is a schematic exploded diagram of a winding assembly of Embodiment 1 of the present invention.

The synchronizing wheel group 1 comprises at least one coil spring 12 and at least two synchronizing wheels 11, and the synchronizing wheels 11 are rotatably disposed on the mounting base 400. Two ends of each coil spring 12 are fixedly connected to two synchronizing wheels 11 respectively so as to be wound on the two synchronizing wheels 11 in opposite winding directions. Each transmission assembly 2 comprises a first bevel gear 22 and a second bevel gear 23 which are engaged with each other, and the first bevel gears 22 of two transmission assemblies 2 at two sides of the synchronizing wheel group 1 are connected with at least one synchronizing wheel 11, wherein the first bevel gear 22 and the second bevel gear 23 are respectively rotatably disposed on the mounting base 400, and the rotating axes of the first bevel gear 22 and the second bevel gear 23 are perpendicular to each other. Referring to FIG. 7, each winding assembly 3 comprises a fixing seat 31 fixedly disposed on the upper end of the curtain body 100, and a winding shaft 32 and a transmission shaft 33 which are rotatably disposed on the fixing seat 31, the transmission shaft 33 is connected with a corresponding second bevel gear 23, the winding shaft 32 and the transmission shaft 33 are connected with each other and coaxial, the outer wall of the winding shaft 32 tilts outward gradually along the axis of the transmission shaft 33, the upper end of the cord 200 is fixedly connected with the end of the winding shaft 32 with a smaller outer diameter, and one end of the fixing seat 31 corresponding to the winding shaft 32 with a larger outer diameter is opened with a threading hole 310 thereon for the cord 200 to pass through. And in the above Configuration B, if there are multiple winding assemblies 3 at the same side of the synchronizing wheels 11, the transmission shafts 33 of the multiple winding assemblies 3 may be the same shaft, and may also be multiple shafts connected successively. In the above mentioned three kinds of configurations, the axes of all transmission shafts 33 coincide with each other, that is, the extending directions are the same.

Figure 5:
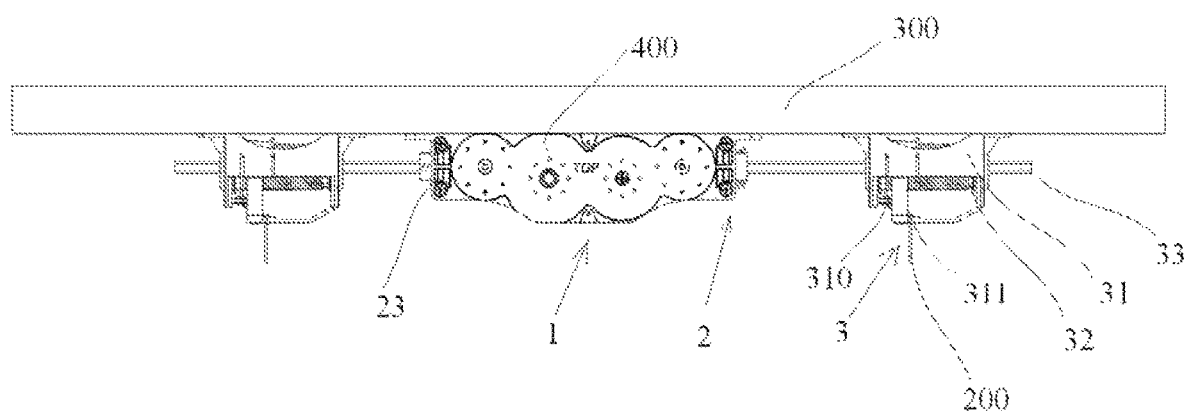
FIG. 5 is a schematic diagram of a retractor of Embodiment 1 of the present invention.
Figure 6:
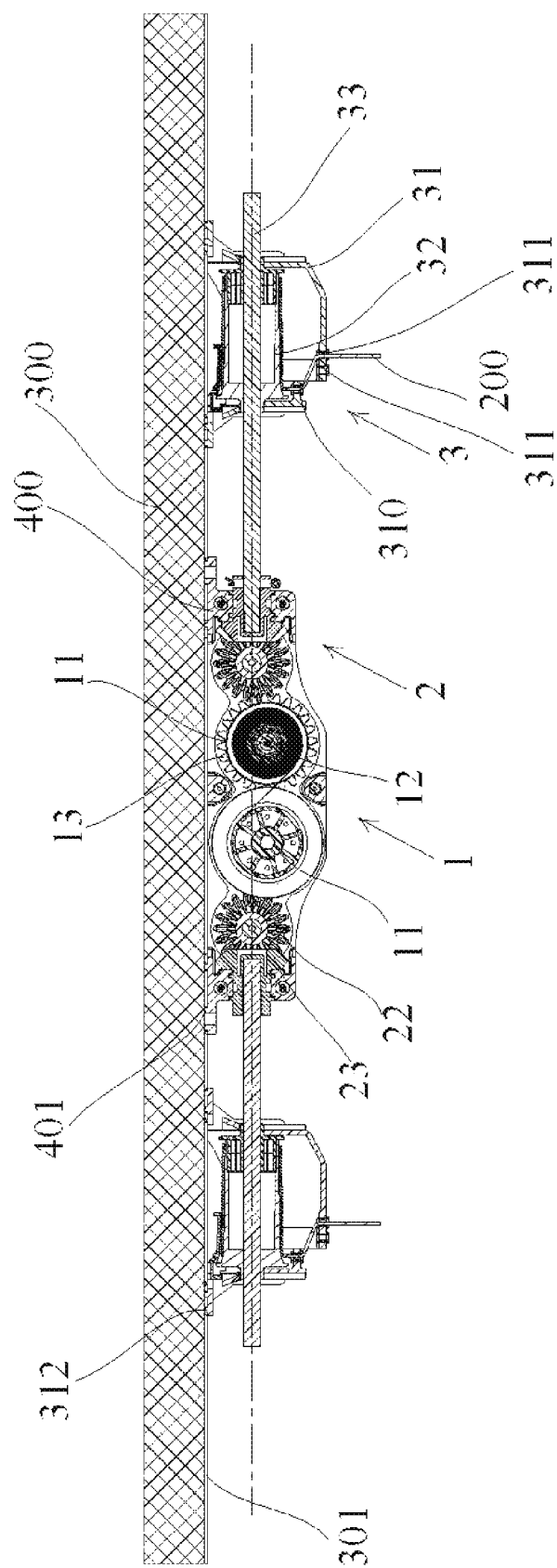
FIG. 6 is a sectional view of the retractor in FIG. 5.

Referring to FIGS. 5 and 6, the rotating axis of the synchronizing wheel 11 and the axis of the transmission shaft 33 are perpendicular to each other, and the axis of the transmission shaft 33 extends in a left-right direction. Specifically in the present embodiment, the rotating axis of the synchronizing wheel 11 and the axis of the transmission shaft 33 are both horizontal, and the rotating axis of the synchronizing wheel 11 extends in a front-rear direction.

Referring to FIG. 7, the fixing seat 31 is further opened with a plurality of guiding holes 311 located at different positions of the fixing seat, the threading hole 310 is located between the guiding holes 311 and the outer wall of the winding shaft 32, the upper end of the cord 200 is connected to the end of the winding shaft 32 with a smaller outer diameter after passing through one guiding hole 311 and the threading hole 310 successively, the cord 200 has different tensile force when passing through different guiding hole 311, such that the tensile force of the cord 200 may be adjusted according to the weight of the curtain body.

The section of the transmission shaft 33 is a polygon, and in particular a regular hexagon, the winding shaft 32 has a hole matched with the regular hexagon, and the winding shaft 32 is sleeved on the transmission shaft 33. And a hole matched with the regular hexagon is also opened on the second bevel gear 23, one end of the winding shaft 32 is inserted into the hole of the second bevel gear 23, and the second bevel gear 23, the transmission shaft 33 and the winding shaft 32 are coaxial.

Figure 8:
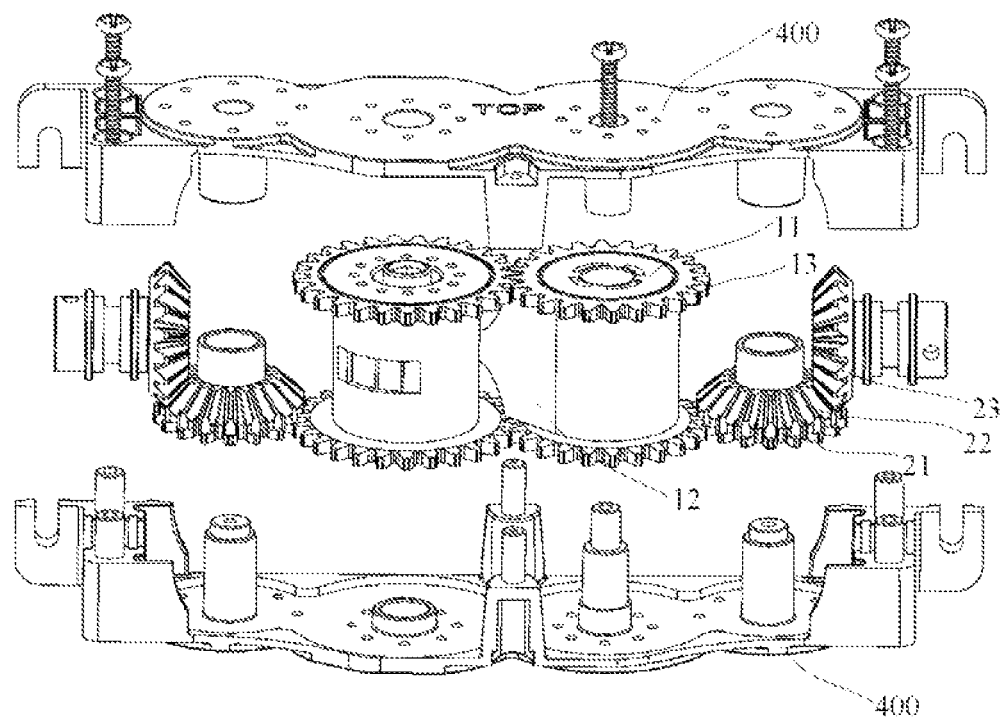
FIGS. 8 and 9 are schematic diagrams of a synchronizing wheel group of Embodiment 1 of the present invention from two viewing angles.
Figure 9:
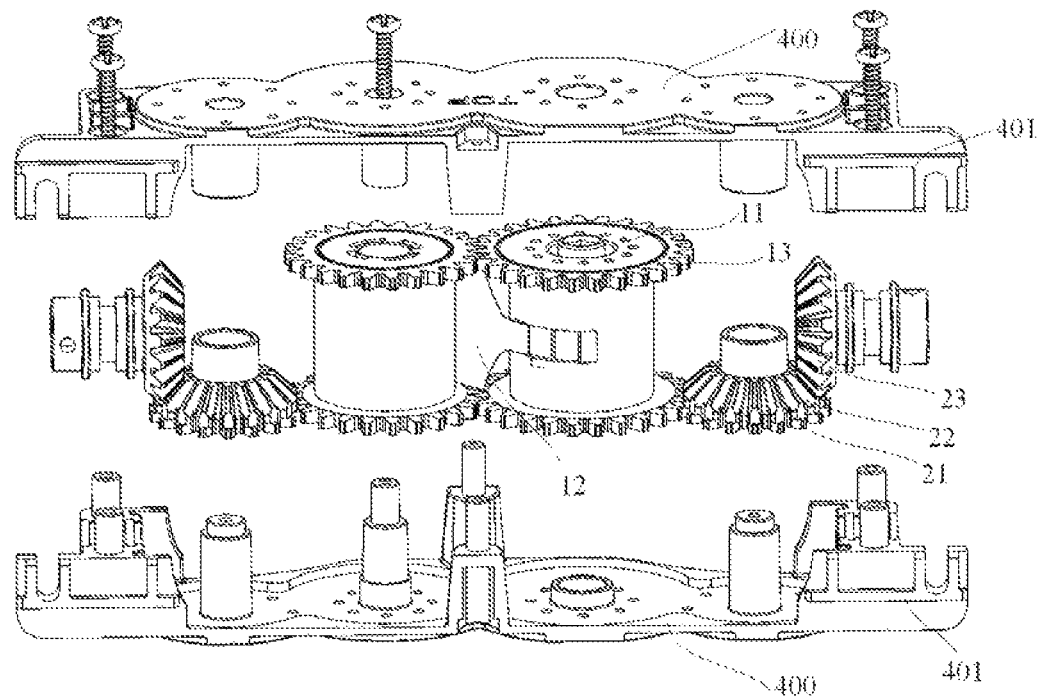
Figure 10:
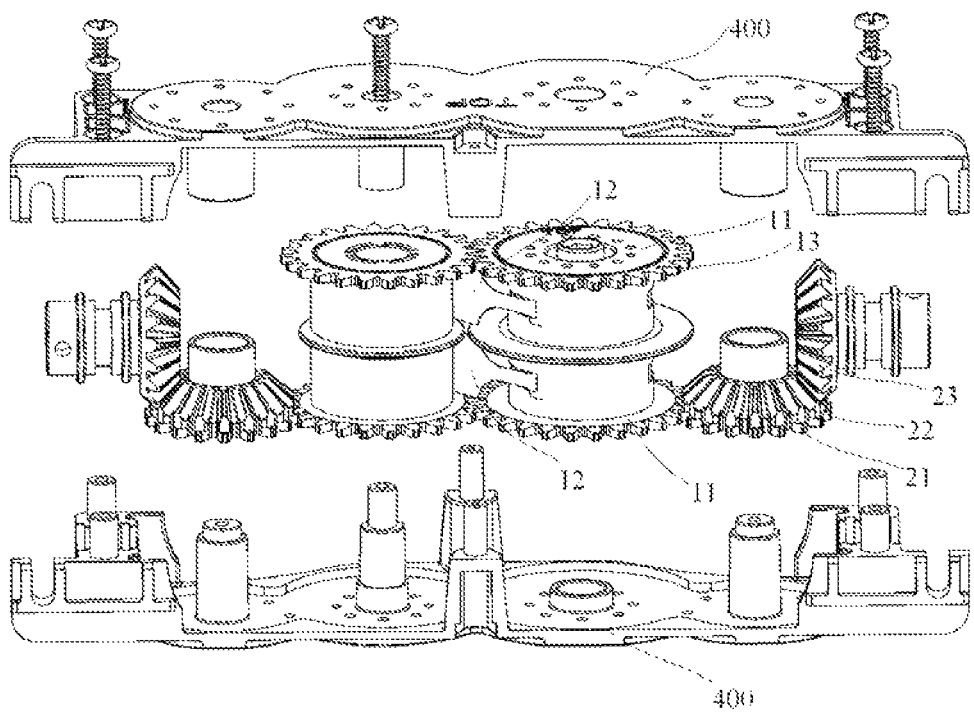
FIGS. 10-13 are schematic diagrams of other kinds of synchronizing wheel groups of the present invention.
Figure 11:
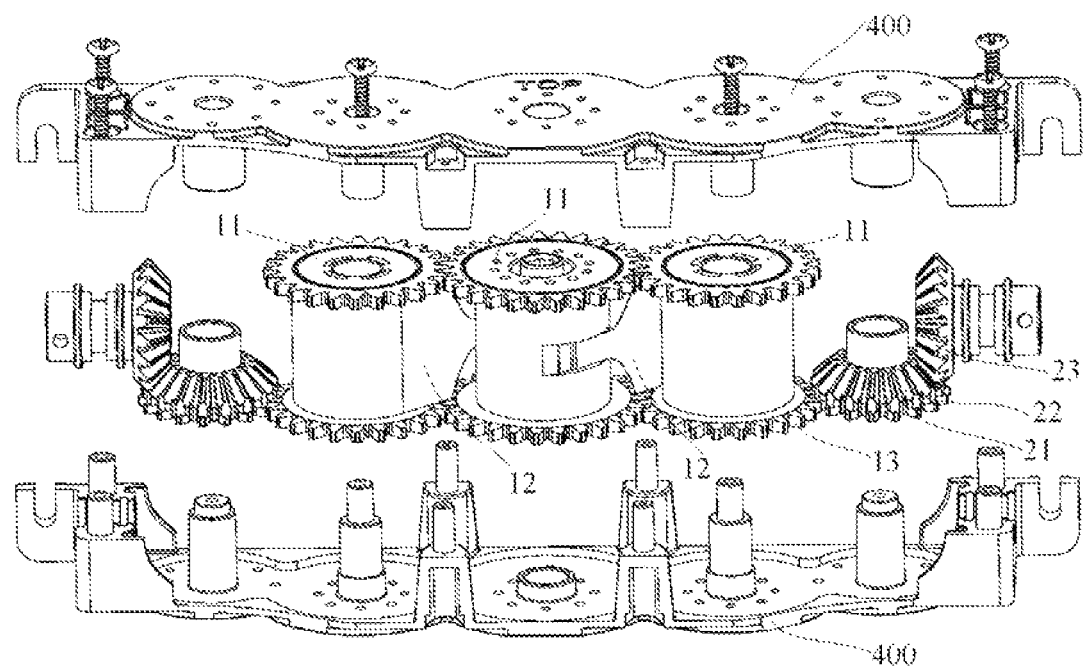
Figure 12:
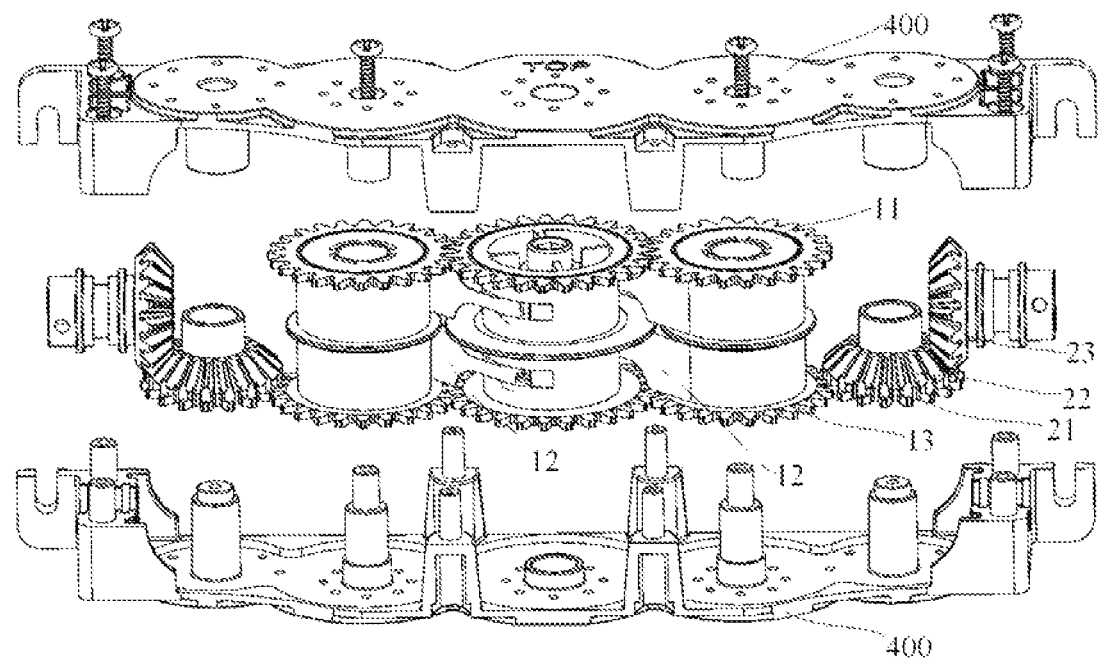
Figure 13:
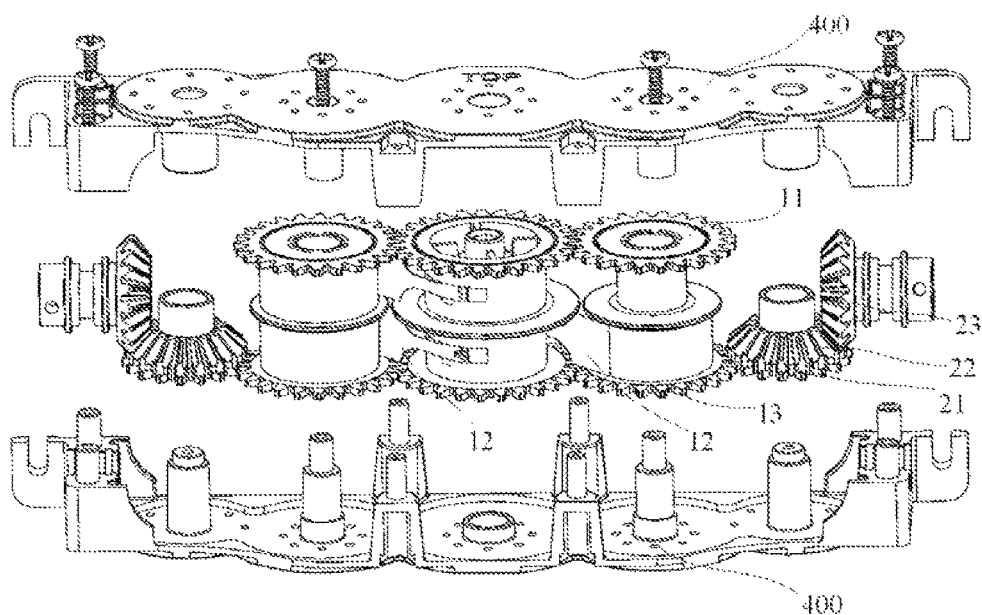

The synchronizing wheels 11 and the coil spring 12 have many kinds of combinations, for example:

Referring to FIGS. 8 and 9, there are two synchronizing wheels 11, the outer wall of each synchronizing wheel 11 is provided with a circle of gear teeth 13, the two synchronizing wheels 11 are engaged with each other via the gear teeth 13, one coil spring 12 is wound on the two synchronizing wheels 11, and each synchronizing wheel 11 is respectively connected with one first bevel gears 22;

Referring to FIG. 10, there are two groups of synchronizing wheels 11, each group of synchronizing wheels 11 has two synchronizing wheels 11, the two synchronizing wheels 11 in each group of synchronizing wheels 11 are coaxial and arranged along the axis thereof successively, the outer wall of at least one synchronizing wheel 11 in each group of synchronizing wheels 11 is provided with a circle of gear teeth 13, the two groups of synchronizing wheels 11 are engaged with each other via the gear teeth 13, one synchronizing wheel 11 in each of the two groups of synchronizing wheels 11 is connected with the two ends of the first coil spring 12 and the first coil spring 12 is wound on the two synchronizing wheels 11, the two ends of the second coil spring 12 are respectively fixedly connected with the other synchronizing wheels 11 in the two groups of synchronizing wheels 11 and the second coil spring 12 is wound on the two synchronizing wheels 11, the first bevel gear 22 at the left side is connected with one synchronizing wheel 11 of the left group of synchronizing wheels 11, and the first bevel gear 22 at the right side is connected with one synchronizing wheel 11 of the right group of synchronizing wheels 11;

Referring to FIG. 11, there are three synchronizing wheels 11, the outer walls of the three synchronizing wheels 11 are each provided with a circle of gear teeth 13, the three synchronizing wheels 11 are engaged with each other via the gear teeth 13 successively, the synchronizing wheel 11 at the leftmost is connected with the first bevel gear 22 at the left side correspondingly, and the synchronizing wheel 11 at the rightmost is connected with the first bevel gear 22 at the right side correspondingly; there are two coil springs 12, two ends of one of the coil springs 12 are respectively fixedly connected with the synchronizing wheel 11 in the middle and the synchronizing wheel 11 at the left side, two ends of the other one of the coil springs 12 are respectively fixedly connected with the synchronizing wheel 11 in the middle and the synchronizing wheel 11 at the right side, and the two coil springs 12 are stacked and wound on the synchronizing wheel 11 in the middle;

Referring to FIG. 12, there are three groups of synchronizing wheels 11, each group of synchronizing wheels 11 has two synchronizing wheels 11, the two synchronizing wheels 11 in each group of synchronizing wheels 11 are coaxial and arranged along the axis thereof successively, at least one synchronizing wheel 11 in each group of synchronizing wheels 11 is provided with gear teeth 13, the three groups of synchronizing wheels 11 are engaged with each other via the gear teeth 13, there are four coil springs 12 wound on the three groups of synchronizing wheels 11, and the winding manner is the same as shown in FIG. 11;

Referring to FIG. 13, the difference between the manners in it and FIG. 12 is that there are three coil springs 12 wound on the three groups of synchronizing wheels 11, wherein no coil spring 12 is wound on two synchronizing wheels 11 respectively belonging to two groups of synchronizing wheels 11;

By adjusting the number of the synchronizing wheels and the number of the coil springs, the above mentioned several manners may be suitable for curtain bodies with different weights, that is, the weight of the curtain body may be adjusted.

The synchronizing wheel 11 and the first bevel gear 22 are uncoaxial, the rotating axis of the synchronizing wheel 11 and the axis of the first bevel gear are parallel to each other, and the synchronizing wheel 11 and the first bevel gear 22 are connected via a cylindrical gear 21. Specifically, the synchronizing wheel 11 is engaged with the cylindrical gear 21 via gear teeth, and the cylindrical gear 21 is coaxial with the first bevel gear 22, and specifically in the present embodiment, the cylindrical gear 21 and the first bevel gear 22 are plastic injection molded integrally or cast formed integrally. In the present embodiment, the first bevel gear 22 and the second bevel gear 23 are both 90 degree bevel gears.

Referring to FIGS. 6, 7 and 9, the upper surface of the support 300 is opened with a position-limit slot 301 extending along the left-right direction, the extending directions of the center line of the position-limit slot 301 and the axis of the transmission shaft 33 are the same, the position-limit slot 301 is a rectangular slot, the lower surface of the mounting base 400 has a position-limit protrusion 401 cooperating with the width of the position-limit slot 301, the lower surface of the fixing seat 31 also has a position-limit protrusion 312 cooperating with the width of the position-limit slot 301, the mounting base 400 and the fixing seat 31 are fixedly connected to the support 300 via screws, and each of the position-limit protrusions 401 and 312 is just stuck within the position-limit slot 301 such that both the mounting base 400 and the fixing seat 31 are linearly arranged along the center line of the position-limit slot 301 after being mounted, to avoid the shift of the transmission shaft 33 and the transmission assemblies 2.

Figure 2:
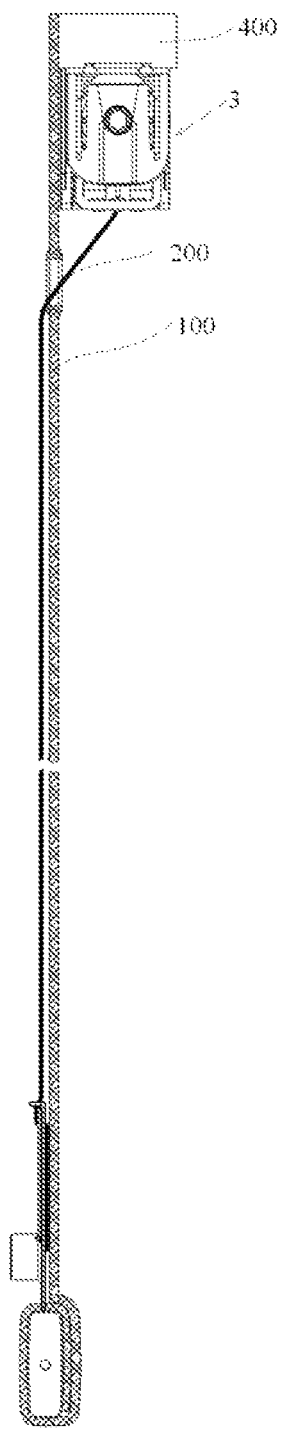
FIG. 2 is a schematic side view of the curtain after being opened of Embodiment 1 of the present invention.

The working process of the retractable curtain is as follows: drawing the curtain body 100 downwards, unwinding the cord 200, driving the winding shaft 32 to rotate, rotating the transmission shaft 33 along with the winding shaft 32, changing the transmission direction by 90 degrees via the transmission assembly 2, driving the synchronizing wheels 11 to rotate along with the transmission assembly 2, gradually unwinding the coil spring 12 from one of the synchronizing wheels 11 and winding it onto the other synchronizing wheel 11 in an opposite direction, and deformation happens to generate an elastic force, due to that this elastic force is not enough to overcome the gravity of the curtain body 100, the curtain body 100 is in an opened state, as shown in FIGS. 1 and 2.

Figure 3:
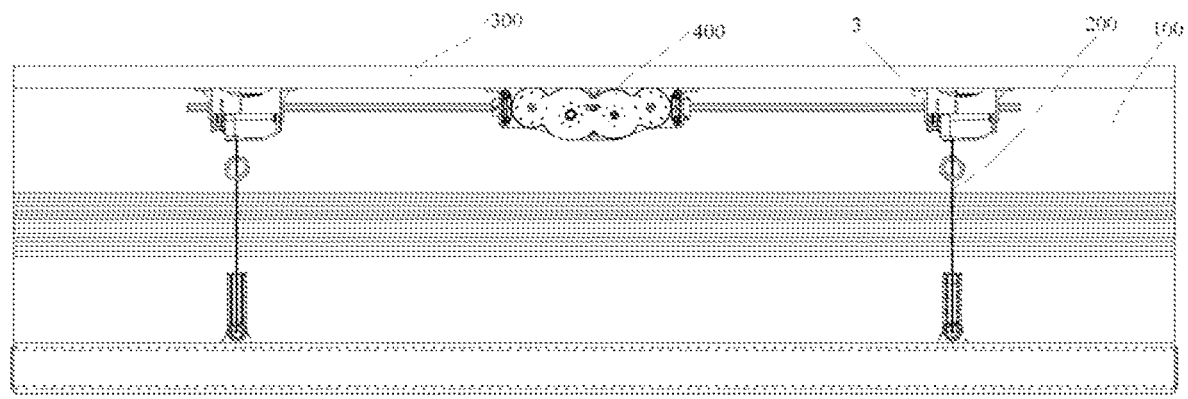
FIG. 3 is a schematic front view of the curtain after being rolled up of Embodiment 1 of the present invention.
Figure 4:
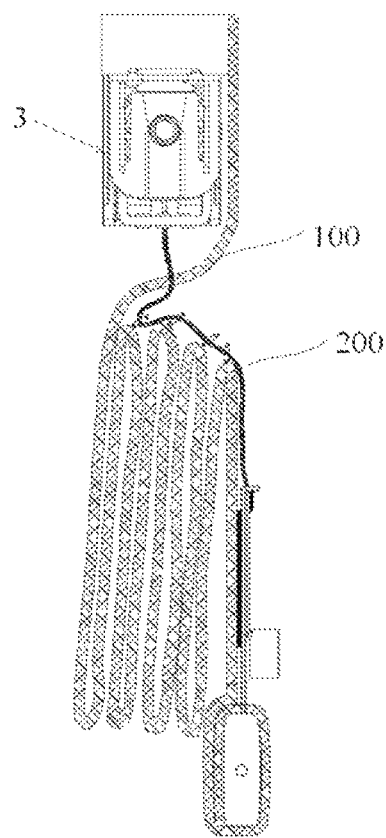
FIG. 4 is a schematic side view of the curtain after being rolled up of Embodiment 1 of the present invention.

By holding or pushing the curtain body 100 upwards, that is, by applying a small thrust on the curtain body 100, a resultant force of this thrust and the elastic force of the coil spring 12 is enough to overcome the gravity of the curtain body 100, the coil spring 12 is reset, the synchronizing wheels 11 rotate in an opposite direction, the winding shaft 32 rotates to roll up the cord 200, and the curtain body 100 is rolled up with it, as shown in FIGS. 3 and 4.

Due to that the outer wall of the winding shaft 32 is a slant surface, and the turns wound on the winding shaft 32 earlier are pushed forwards by the turns wound later successively during rolling up to form single-layer winding, which avoids intertwining or tying occurring due to stacking of the cord 200 and results in smooth retracting; meanwhile, by changing the transmission direction via the transmission assemblies 2, the retractor has a reasonable arrangement and a compact structure.

Embodiment 2

Figure 14:
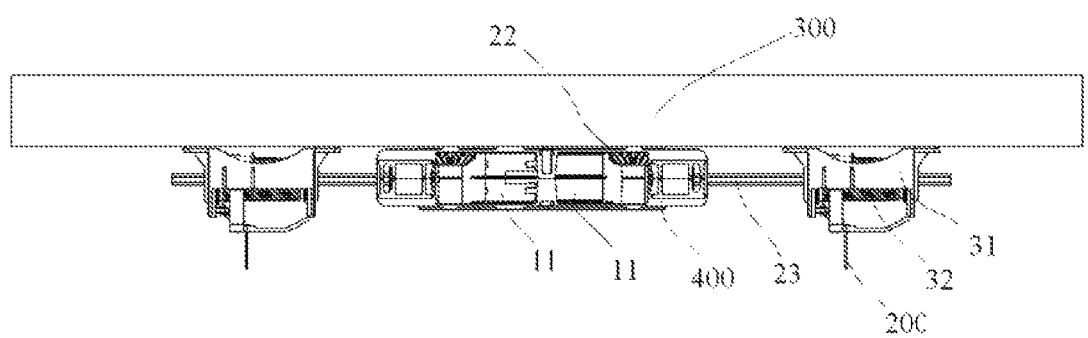
FIG. 14 is a schematic diagram of a retractor of Embodiment 2 of the present invention.

Referring to FIG. 14, the distinction between the present embodiment and Embodiment 1 is only that: the rotating axes of the synchronizing wheels are vertical, that is, extend along a up-down direction.

Embodiment 3

Figure 15:
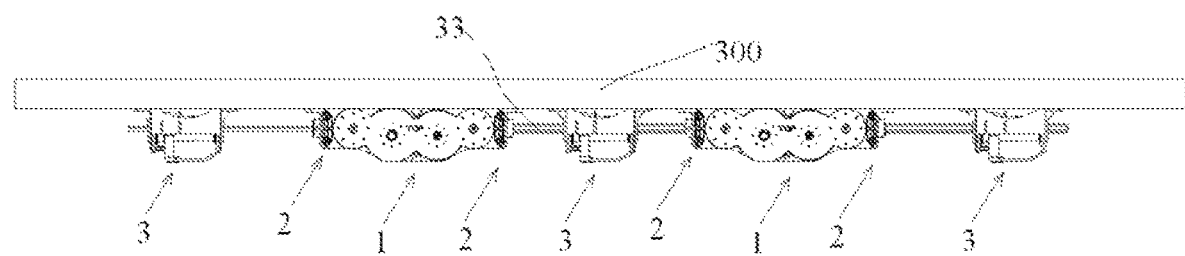
FIG. 15 is a schematic diagram of a retractor of Embodiment 3 of the present invention.

Referring to FIG. 15, the distinction between the present embodiment and Embodiment 1 is only that: the retractor is disposed according to the above Configuration C, that is, there are several synchronizing wheel groups 1, and also several winding assemblies 3, the transmission assemblies 2 at the left and right sides of each synchronizing wheel group 1 are respectively connected with at least one winding assembly 3, wherein one or more winding assemblies 3 are located between two adjacent synchronizing wheel groups 1. Specifically in the present embodiment, one winding assembly 3 is respectively disposed at the left and right sides of each synchronizing wheel group 1, wherein the two ends of the transmission shaft 33 of the winding assembly 3 located between the opposite transmission assemblies 2 of two synchronizing wheel groups 1 are respectively connected with the second bevel gears 23 of these two transmission assemblies 2.

The embodiments described above are only for illustrating the technical concepts and features of the present invention, are preferred embodiments, and are intended to make those skilled in the art being able to understand the present invention and thereby implement it, and should not be concluded to limit the protective scope of this invention. Any equivalent variations or modifications according to the present invention should be covered by the protective scope of the present invention.

What is claimed is:

1. A retractable curtain, comprising a curtain body, cords for retracting the curtain body, a retractor for retracting the cords, wherein the retractor comprises at least two winding assemblies, at least one synchronizing wheel group and transmission assemblies located at two sides of each synchronizing wheel group for changing transmission direction, each of the transmission assemblies is connected with at least one of the winding assemblies;

each of the at least one synchronizing wheel group comprises at least one coil spring and at least two synchronizing wheels, and two ends of each coil spring are fixedly connected to two synchronizing wheels respectively so as to be wound on the two synchronizing wheels in opposite winding directions;

each of the transmission assemblies comprises a first bevel gear and a second bevel gear which are engaged with each other, and the first bevel gears are connected with at least one of the synchronizing wheels;

each of the winding assemblies comprises a fixing seat, a winding shaft and a transmission shaft which are rotatably provided on the fixing seat, the transmission shaft is connected with one of the second bevel gears, the transmission shaft passes through the winding shaft and is coaxial with the winding shaft, one of the cords is connected with one end of the winding shaft;

further wherein the retractor comprises a support connecting to the curtain body and at least one mounting base, each of the synchronizing wheel group and the transmission assemblies on the two sides thereof are mounted on one of the mounting base, and the synchronizing wheels, the first bevel gears and the second bevel gears are rotatably provided on the mounting base;

the mounting base(s) and the fixing seats are fixedly provided on the support, a position-limit slot extending along axes of the transmission shafts is provided on the support, the position-limit slot is a rectangular slot, a lower surface of the mounting base(s) has a position-limit protrusion(s) cooperating with a width of the position-limit slot, lower surfaces of the fixing seats have position-limit protrusions cooperating with the width of the position-limit slot, each of the position-limit protrusions is embedded in the position-limit slot so as to arrange both the mounting base(s) and the fixing seats along a center line of the position-limit slot.

2. The retractable curtain according to claim 1, wherein a threading hole and a plurality of guiding holes are provided on each fixing seat, the guiding holes are provided on one wall of each fixing seat and at different positions of the wall, one of the cords passes through the threading hole and any one of the first guiding hole successively.

3. The retractable curtain according to claim 2, wherein the threading hole is located between an outer wall of each winding shaft and the guiding holes thereon.

4. The retractable curtain according to claim 2, wherein the threading hole is set on a part of each fixing seat corresponding to one end of each winding shaft.

5. The retractable curtain according to claim 2, an outer wall of each winding shaft tilts outward gradually along an axis of each winding shaft, the threading hole is set on a part of each fixing seat corresponding to one end of each winding shaft with a larger outer diameter, and each cord is connected with the other one end of each winding shaft with a smaller outer diameter.

6. The retractable curtain according to claim 1, wherein the transmission assembly at each side of the synchronizing wheel group is connected with one of the winding assemblies.

7. The retractable curtain according to claim 1, wherein the transmission assembly at one side of the synchronizing wheel group is connected with at least two of the winding assemblies, and the transmission assembly at the other side of the synchronizing wheel group is connected with one or more of the winding assemblies, the transmission shafts at the same side are coaxial.

8. The retractable curtain according to claim 1, wherein the retractor comprises a plurality of the synchronizing wheel groups, two sides of each synchronizing wheel group are respectively provided with one of the transmission assemblies, and the transmission assemblies at two sides of each synchronizing wheel group are respectively connected with at least one of the winding assemblies.

9. The retractable curtain according to claim 1, wherein rotating axes of the synchronizing wheels and axes of the transmission shafts are perpendicular to each other.

* * * * *